United States Patent [19]

Stanko

[11] 4,173,286
[45] Nov. 6, 1979

[54] REUSABLE RESILIENT PACKAGING

[76] Inventor: John J. Stanko, 327 Coraopolis Rd., Coraopolis, Pa. 15108

[21] Appl. No.: 919,421

[22] Filed: Jun. 26, 1978

[51] Int. Cl.² .................... B65D 85/62; B65D 81/06; B65D 1/36
[52] U.S. Cl. .................................. 206/433; 206/523; 206/563; 206/589; 220/4 E
[58] Field of Search ............... 206/433, 523, 563, 589; 220/4 E; 229/2.5

[56] References Cited

U.S. PATENT DOCUMENTS

| | | | |
|---|---|---|---|
| 3,013,656 | 12/1961 | Murph, Jr. | 206/563 |
| 3,146,929 | 9/1964 | Keim | 206/523 |
| 3,311,231 | 3/1967 | English, Jr. | 206/523 |

Primary Examiner—William T. Dixson, Jr.
Attorney, Agent, or Firm—Buell, Blenko & Ziesenheim

[57] ABSTRACT

A reusable resilient package particularly for the shipment of beverage cans is provided having at least two mating half sections, each containing at least one pair of mating recesses, one recess of each pair receiving half of a lengthwise section of a beverage can of one size and the other recess of each pair receiving half of the lengthwise section of a beverage can of different size having a like diameter but shorter length, said two half sections in one position receiving in each pair of recesses a can of one size and a can of different size and, in a second position, receiving in each pair of recesses two cans of said different size.

5 Claims, 4 Drawing Figures

REUSABLE RESILIENT PACKAGING

This invention relates to reusable resilient packaging and particularly to a reusable shipping container which can be used for at least two different sizes of cans to insure their arrival at their destination in an undamaged condition and the safe and rapid return of the container to its original shipper.

In one application of this invention, it may be used for shipping and protecting beer and similar beverage cans, either full or empty, in sales or exchanges between can collectors or connoisseurs of the beverage, however, the invention is not so limited. In the beverage industry, particularly the beer industry, there are in use, predominantly two sizes of cans which differ in length but not in diameter. These cans, particularly when empty, are fragile and easily dented and damaged. There is a very lively trade in exchanging and selling empty beer cans between collectors and from suppliers to collectors, as well as in the sale of exotic and unique beers from suppliers to connoisseurs. In both instanances, the two different common sizes of beer cans are primarily involved, i.e., 12 oz. and 16 oz. These cans must be shipped considerable distances in many cases and can be readily damaged as a result.

I have developed a reusable resilient packaging for such cans which permits their safe shipment and exchange, with the return of the package or container to the original shipper. The package of my invention is light in weight, strong, quickly adapted to carry one or both sizes of beverage cans, and will protect such beverage cans, full or empty, against damage in transit. In addition, the shipment instructions, i.e., the addressee/addressor relationship can be changed by simply moving a single name tag.

I provide a reusable resilient package comprising at least first and second half sections each containing at least one pair of mating recesses, one recess of each pair receiving half of the lengthwise section of a beverage can of one size and the other recess of each pair receiving half of the lengthwise section of a beverage can of a different smaller size lengthwise thereof, vertical male index members at diagonally opposed corners of each half section and diagonally opposed female index members at the other corners of each half section, said two half sections when superimposed in one position receiving one can of one size and one can of said different smaller size and in a second position shifted 180°, receiving two cans of said different smaller size against relative movement, fastening means removably connecting said first and second half sections in either the first or second position and changeable name means on one of said half sections. Preferably, the half sections are formed of lightweight, cellular resin such as styrofoam or polyurethane which forms a hard smooth surface shell. In a preferrred form, the changeable name means is a generally rectangular recess in the outer surface of one half section carrying the identical name and address in the position of addressee and addressor and a changeable address overlay which may be temporarily fixed over one or the other of said addressee or addressor positions. The package may be made up of a plurality of half sections in which an intermediate member combines two half sections and has recesses opening outwardly on opposite sides. Preferably, the fastening means is a pressure sensitive tape wrapped over the joint between two mating halves. The changeable address overlay is preferably a reusable pressure sensitive strip.

In the foregoing general description of this invention, I have set out certain objects, purposes and advantages. Other objects, purposes and advantages will be apparent from a consideration of the following description and the accompanying drawings in which.

Figure 1:
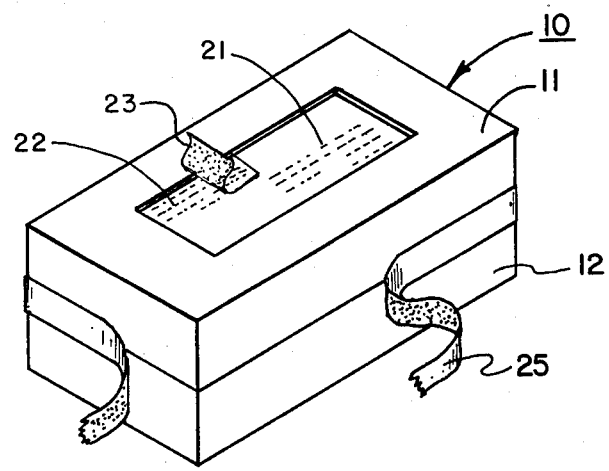
FIG. 1 is an isometric view of one form of closed package according to this invention.

Referring to the drawings, I have illustrated a substantially rectangular container 10 of foamed resin having a first half section 11 and a second half section 12. The two half sections 11 and 12 are each provided at diagonally opposite corners with vertically aligned interfitting male 13 index members and female 14 index members. Each half section 11 and 12 is provided with paired mating recesses 15 and 16, one recess 15 of each pair receiving half of a beverage can 17 of one size and the other recess 16 of each pair receiving half of a beverage can 18 of a different smaller size (length), e.g., 16 oz. and 12 oz. cans.

A recess 20, preferably rectangular in shape, is provided in the outer top surface of one half section 11. This recess carries an addressee name and address 21 permanently or semi-permanently fixed in the center thereof and the same name and address as a return address 22 in the upper left corner of the recess. A removable changeable address overlay 23 which may be a pressure sensitive label is provided for use successively as the addressee, being removably placed over address portion 21 and when the container is returned the overlay 23 is shifted to cover return address 22.

The two half sections 11 and 12 are joined during shipping by a removable pressure sensitive tape 25.

Figure 2:
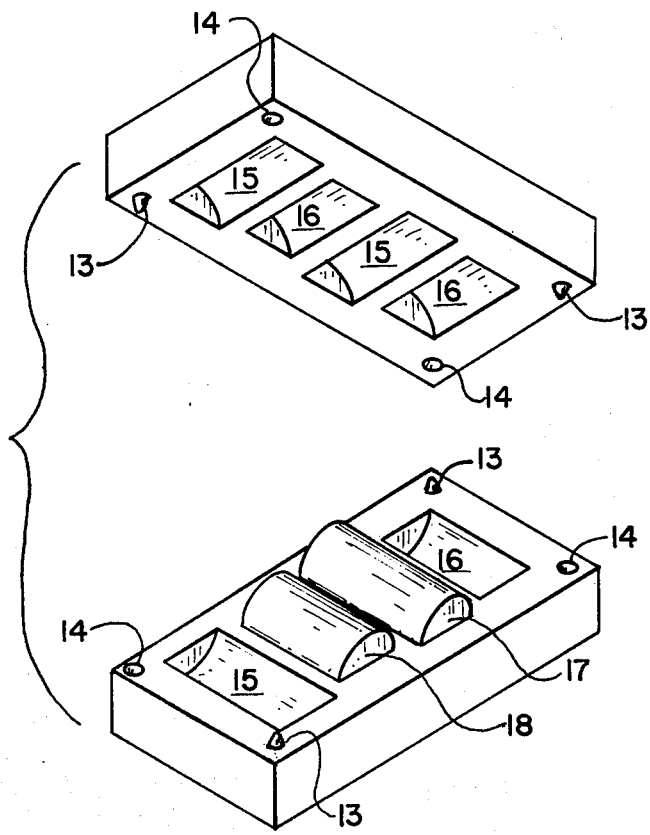
FIG. 2 is an isometric view of the container of FIG. 1 in one open position.
Figure 3:
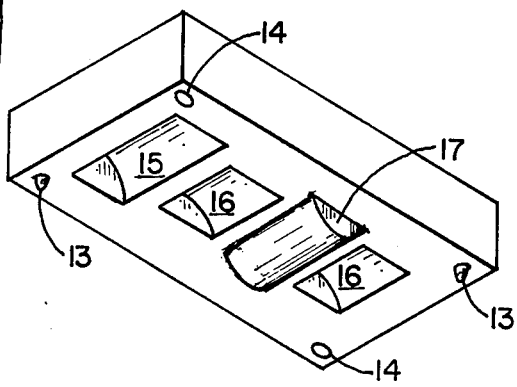
FIG. 3 is an isometric view of the container of FIG. 1 in a second open position.
Figure 3:
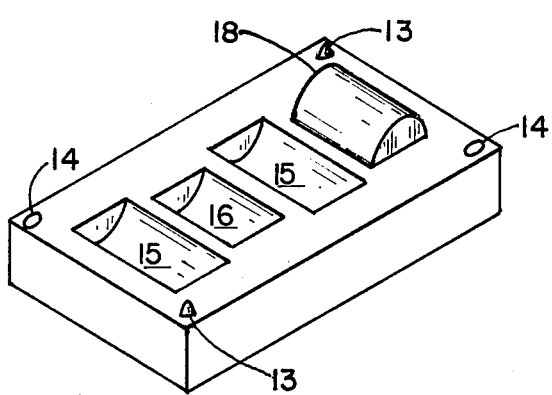

When it is desired to ship two different size cans, the recesses 15 and 16 are vertically aligned as shown in FIG. 2. When it is desired to ship all smaller cans, one of the half sections is rotated 180° to the position shown in FIG. 3 in which a small can is held against lengthwise movement in each of the smaller recesses 16.

Figure 4:
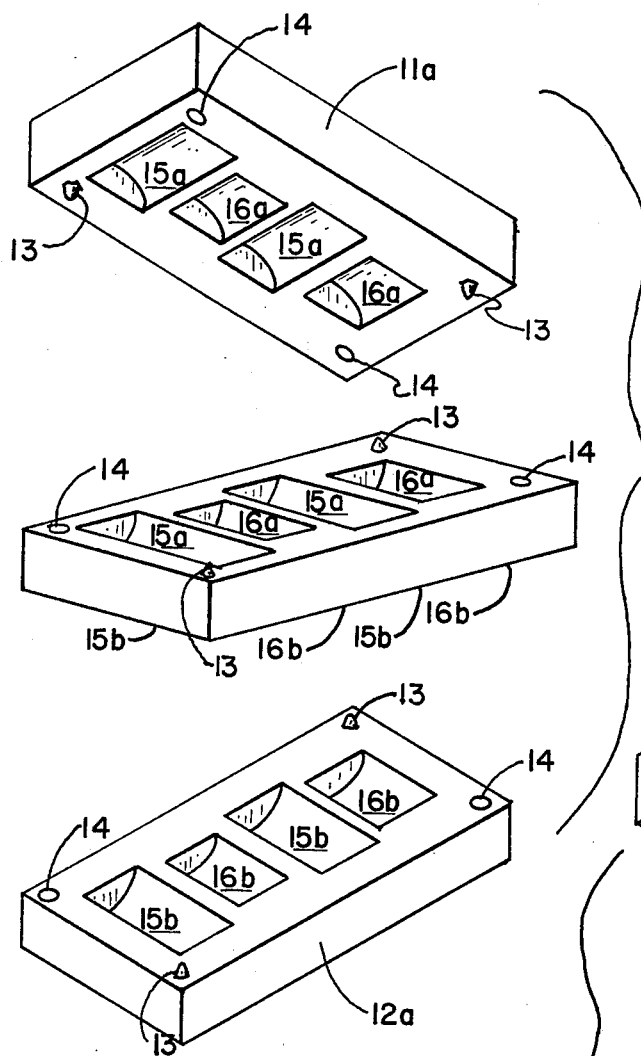
FIG. 4 is an isometric view of a second form of package according to this invention in one open position.

In FIG. 4, I have illustrated an embodiment in which two half sections are combined in a single intermediate section or unit 30 having recesses 15a and 16a opening upwardly and recesses 15b and 16b opening downwardly. This intermediate section 30 is incorporated between a top half section 11a identical with half section 11 of FIGS. 1–3 and a bottom section 12a identical with half section 12 of FIGS. 1–3 for shipment of a double layer of cans. Of course, multiples of this intermediate section can be used for increased numbers of cans.

While I have illustrated and described certain preferred embodiments and practices of my invention in the foregoing specification, it is obvious that this invention may be otherwise embodied within the scope of the following claims.

I claim:

1. A reusable resilient package particularly for the shipment of beverage cans comprising at least first and second half sections, each containing at least one pair of mating recesses, one recess of each pair receiving half of the lengthwise section of a beverage can of one size and the other recess of each pair receiving half of the lengthwise section of a beverage can of different size having a like diameter but a shorter length, cooperating index means on said first and second half sections, said two half sections when superimposed in one position receiving one can of one size and one can of said different size in each pair of mating recesses and in a second position in which one half section is rotated 180° from said first position, receiving two cans of said one different size in each pair of mating recesses, said cans being held against relative movement in said recesses in both positions, fastening means removably connecting said first and second half sections in either said first and second positions and changeable name means on one of said half sections.

2. A reusable resilient package as claimed in claim 1 made of cellular resin having an integral relatively hard smooth outer surface.

3. A reusable resilient package as claimed in claim 1 wherein the index means comprises vertical male index members at diagonally opposed corners of each half section and corresponding shaped diagonally opposed female index members at the other corners of each half section.

4. A reusable resilient package as claimed in claim 1 wherein the changeable name means includes a generally rectangular recess in the outer surface of one of said half sections carrying the identical address in both an addressee and a return address locations in said recess and a changeable address overlay movable between said addressee and return address location in said recess.

5. A reusable resilient package as claimed in claim 1 including an intermediate member integrally combining two half sections having said mating pairs of recesses opening outwardly on opposite sides.

* * * * *